Oct. 21, 1941.     H. ELLINGSEN     2,259,684
ONE-WAY BRAKE ARRANGEMENT IN MOTOR DRIVEN VEHICLES
Filed Feb. 20, 1940     3 Sheets-Sheet 1

Inventor,
H. Ellingsen
By Glascock Downing Seebold
Attys.

Oct. 21, 1941.   H. ELLINGSEN   2,259,684
ONE-WAY BRAKE ARRANGEMENT IN MOTOR DRIVEN VEHICLES
Filed Feb. 20, 1940   3 Sheets-Sheet 3

Inventor,
H. Ellingsen
By: Glascock Downing & Seebold

Patented Oct. 21, 1941

2,259,684

UNITED STATES PATENT OFFICE 2,259,684

ONE-WAY BRAKE ARRANGEMENT IN MOTOR DRIVEN VEHICLES

Haakon Ellingsen, Skien, Norway

Application February 20, 1940, Serial No. 319,968
In Norway February 21, 1939

4 Claims. (Cl. 192—13)

The present invention relates to an arrangement in motor driven vehicles of the kind in which a coupling is provided which prevents the vehicle when coupled for instance for forward drive, from rolling rearwards, or when the vehicle is coupled for rearward drive, from rolling forwards.

In this kind of vehicles it is of importance that the operation of these means take place automatically and that the disconnection of the same occurs without difficulty.

According to the present invention a one way coupling is provided on one of the shafts of the vehicle, which one way coupling on the one hand is secured to the chassis or frame of the vehicle by means of a releasable friction coupling and on the other hand to the shaft, so that the shaft is able to rotate in one direction only relatively to the chassis, and the main feature of the invention is that this friction coupling is formed as a laminated coupling, connection being provided between the manual control for the ordinary clutch and the laminated coupling in such a way that the laminated coupling is manually released by the continued movement of the operating member of the clutch after the clutch has been disengaged.

If the said one way coupling is connected to the driving shaft so that this shaft is able to rotate only in the direction of forward drive of the vehicle, it is possible to release the clutch as well as the hand and foot brake without the vehicle being able to roll rearwards, and the starting of the vehicle forwards will then for instance on a hill take place in exactly the same manner as the starting of the vehicle on a horizontal road.

The one way coupling is provided on one of the shafts which regardless of the position of the reverse gear always will rotate in one and the same direction. The said one way coupling therefore operates automatically so that the vehicle, if the reverse gear is set for rearward drive, is only able to roll rearwards, but if it is set for forward drive the vehicle will be able to roll only forwards.

On an automobile of ordinary kind one has such a shaft between the ordinary clutch which is located rearwardly of the motor and the usual gear box. In the gear box itself there is also a shaft which always rotates in the same direction. The said one way coupling is therefore suitably provided between one of these shafts and the chassis or frame of the vehicle, or a part secured to the chassis or frame.

An embodiment of the invention is described in the following with reference to the accompanying drawings, in which.

Figure 1:
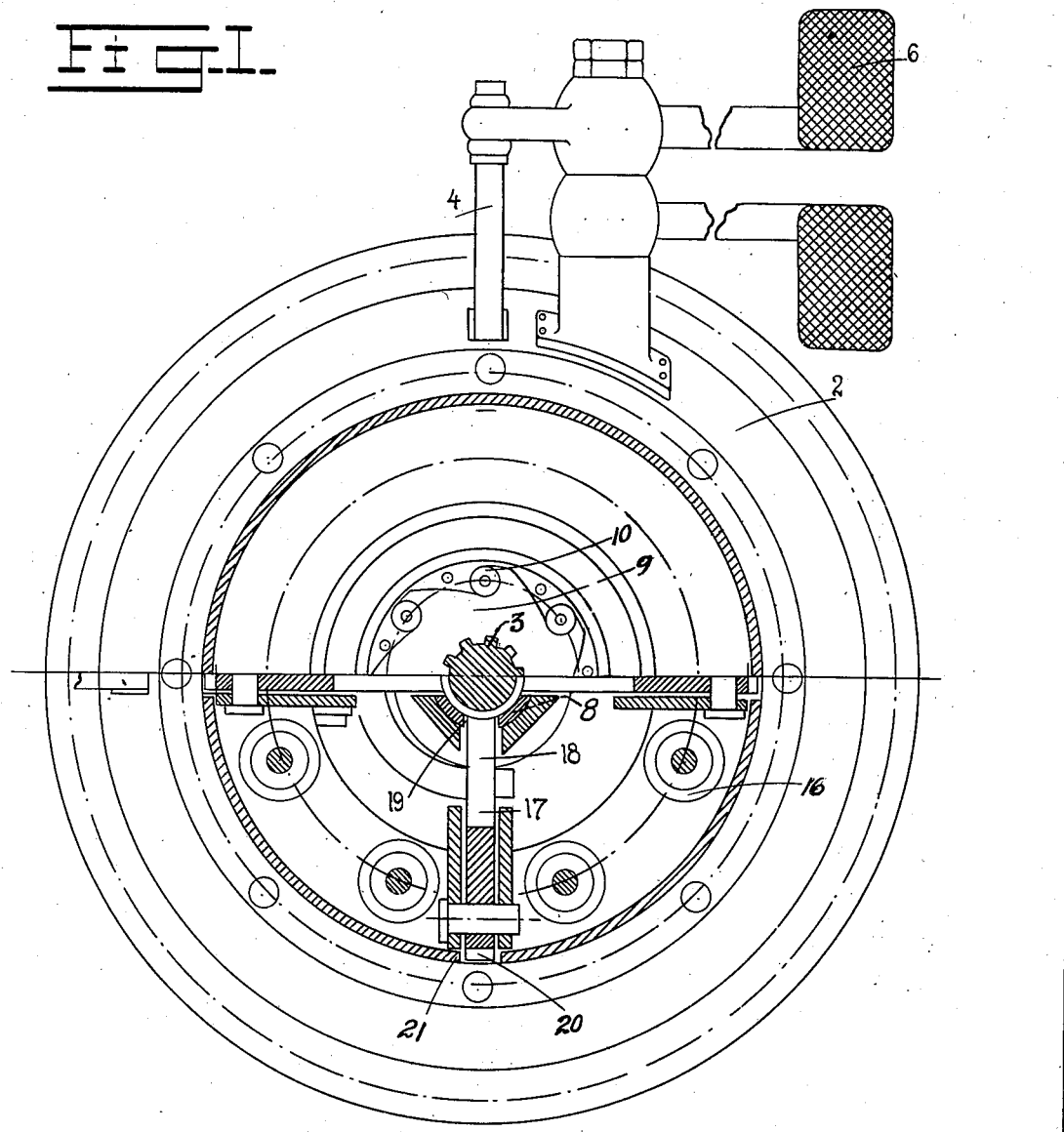
Fig. 1 is a vertical section on the line I—I in Fig. 2.
Figure 2:
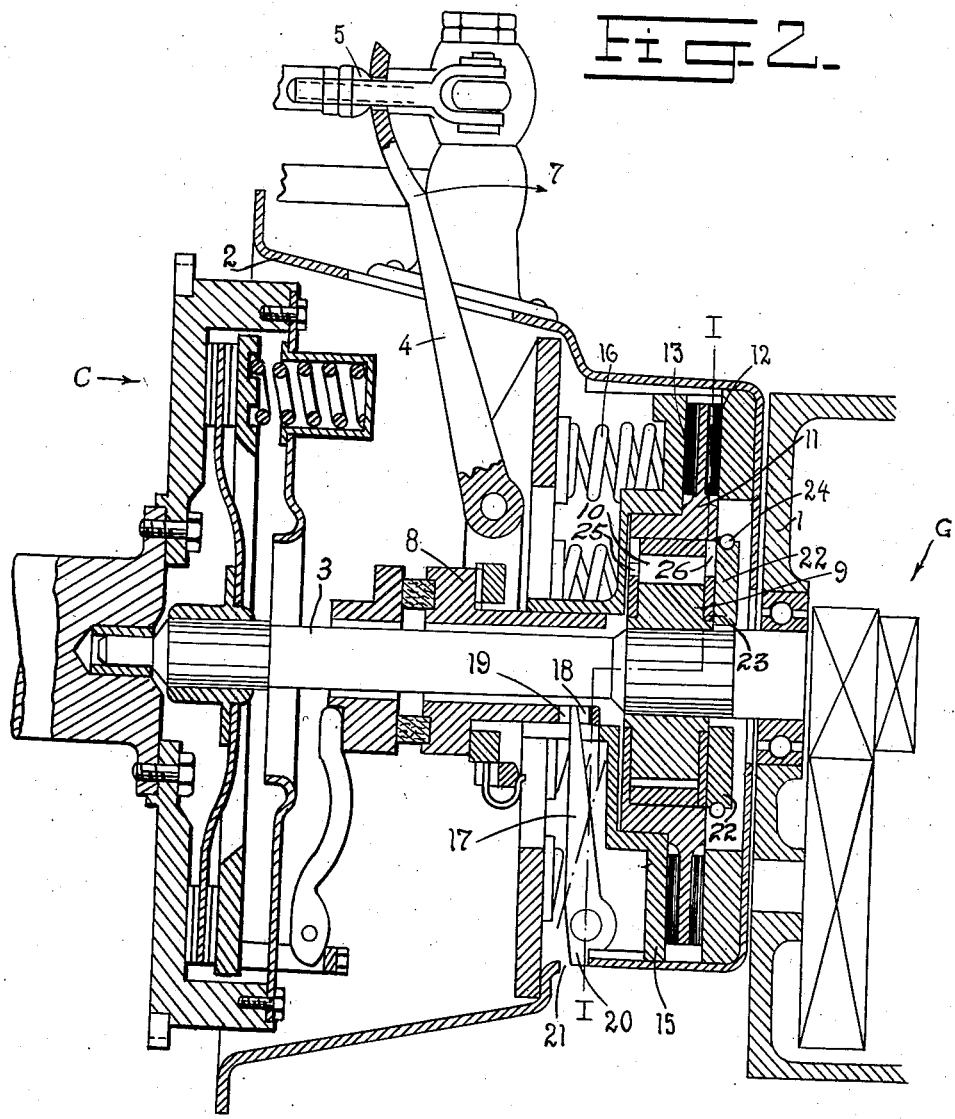
Fig. 2 is a horizontal longitudinal sectional view of the device.
Figure 3:
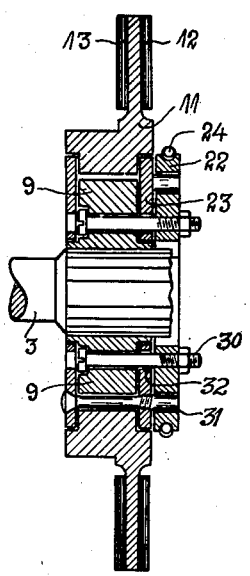
Figs. 3, 4, 5 and 6 illustrate the one way coupling itself in respectively section, front view, a framentary sectional view and a plan view with the top plate partially removed.
Figure 4:
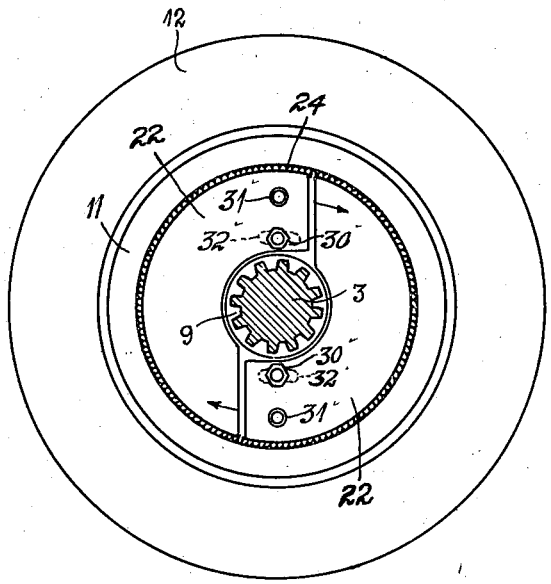
Figure 5:
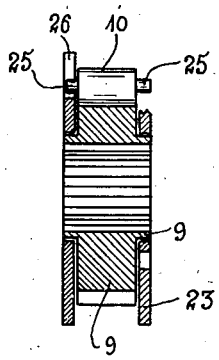
Figure 6:
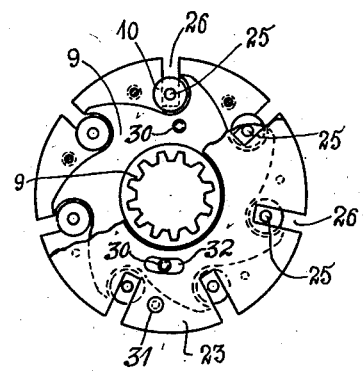

In the drawings I designates the usual gear box containing the transmission gears G. 2 designates the casing which encloses the conventional vehicle clutch between the motor and the gear box, and 3 designates the shaft between the vehicle clutch and the gear box. The said coupling or clutch is indicated at C and 4 designates a lever which is operated by a connecting member 5 which is connected to the pedal 6 and which by depressing of the pedal 6 will move in the direction of the arrow 7 and operate the sleeve 8 for engaging and disengaging the vehicle clutch in the well known manner.

On the shaft 3 a one way coupling is provided with an interior part 9, rollers 10 and an exterior sleeve 11 which by means of coupling members 12, 13 and an exterior ring 15 together with helical springs 16 are pressed against and locked against rotation relatively to the casing 2 which in its turn is secured to the frame or chassis of the vehicle. To the ring 15 is pivotally secured a lever 17 which with a tongue 18 engages into a hole 19 in the clutch operating sleeve 8, the lever having a further tongue 20 which fits into a hole 21 in the casing 2 so that the sleeve 8 if moved far to the left, will engage the tongue 18 and turn the lever 17 about the point of engagement of the tongue 20 with the edge of the hole 21 and thereby lift the ring 15, so that the exterior ring 11 of the one way coupling is released. This mechanism as above described operates as follows:

The shaft 3 will only rotate freely in counterclockwise direction in Fig. 1, because the rollers 10 in this case will occupy an inoperative position between the part 9 and the exterior ring 11 on the one way coupling. If, however, the shaft 3 tends to rotate in the other direction, the rollers 10 will in a manner known per se arrive in locking position and prevent the rotation. Further according to the invention, in order to secure that this operation of the different parts of the one way coupling takes place in a satisfactory manner, an automatically operating control member or a regulator is provided, which may consist of two substantially halfcircular parts 22, each of which in the radial direction of the one way coupling, on the one hand is pivotally secured to a pin 30 which in its turn is secured to the part 9, and on the other hand with a corresponding pin 31 is secured to a disc 23, a helical spring 24 being placed around these two parts 22, at the point where each pin 30 passes through the disc 23 the latter is provided with an arcuate slot 32 accommodating limited angular displacement of the part 9 with relation to the discs. The rollers 10 are provided with terminal pins 25 guided in radial slots 26 in the discs 23. The tension of the spring 24 tends to draw the parts 22 together and this tends to effect an angular displacement of the part 9 with relation to the discs 23 and consequently the discs acting through the terminal pins 25 of the rollers 10 tend to move said rollers into operative position. As the rotational direction of the shaft 3 is the same regardless the position of the different gears in the gear box, the one way coupling always operates in such a manner that the vehicle is only able to roll in the direction determined by the gears in the gear box. If for some reason or other it is desired that the vehicle shall be able to roll freely in the opposite direction, it is only necessary to depress the clutch pedal 6 entirely, whereby the coupling ring 15 is lifted and the exterior ring 11 of the one way coupling is released, after which the shaft 3, as well the interior part 9 as the exterior sleeve 11 of the one way coupling can rotate in the opposite direction. The device will also prevent back stroke at the starting of the motor.

I claim:

1. In a motor vehicle, a power transmission including a reverse gear for changing the direction of vehicle travel and a clutch connected with said gear and a power driven shaft having uni-directional movement, a one-way coupling connected with said shaft, a releasable frictional coupling for connecting said one-way coupling to the vehicle frame, means for manually controlling the clutch and the connection between said manually controlled means and said friction coupling for releasing the latter and rendering said one-way coupling ineffective.

2. A motor vehicle as claimed in claim 1, characterized in that said manually controlled means operates the friction coupling only after complete disengagement of said clutch.

3. A motor vehicle as claimed in claim 1, characterized in that said one-way coupling includes coupling rollers, coupling members coacting with said rollers and means normally tending to move said rollers to operative position, said means including discs having radial slots for guiding said rollers and spring means interposed between certain of the coupling members and said discs.

4. A motor vehicle as claimed in claim 1, characterized in that said one-way coupling includes coupling rollers, coupling members coacting with said rollers and means normally tending to move said rollers to operative position, said means including discs having radial slots for guiding the movement of said rollers, companion arcuate members connected on the one hand with one of the clutch members and on the other hand with said discs and means normally tending to displace said arcuate members to cause angular displacement of said coupling members with relation to the discs and thereby operatively position the coupling rollers.

HAAKON ELLINGSEN.